(12) United States Patent
Chartier et al.

(10) Patent No.: US 9,790,794 B2
(45) Date of Patent: Oct. 17, 2017

(54) PROPELLER COMPRISING A MOVEABLE DYNAMIC SCOOP

(71) Applicant: SNECMA, Paris (FR)

(72) Inventors: Sarah Chartier, Paris (FR); Adrien Jacques Philippe Fabre, Montrouge (FR); Dominik Igel, Hericy (FR); Christophe Jacquemard, Hericy (FR); Sébastien Tajan, Sucy en Brie (FR)

(73) Assignee: SNECMA, Paris (FR)

( * ) Notice: Subject to any disclaimer, the term of this patent is extended or adjusted under 35 U.S.C. 154(b) by 272 days.

(21) Appl. No.: 14/433,408

(22) PCT Filed: Oct. 8, 2013

(86) PCT No.: PCT/FR2013/052382
§ 371 (c)(1),
(2) Date: Apr. 3, 2015

(87) PCT Pub. No.: WO2014/057199
PCT Pub. Date: Apr. 17, 2014

(65) Prior Publication Data
US 2015/0260045 A1    Sep. 17, 2015

(30) Foreign Application Priority Data
Oct. 10, 2012 (FR) ..................... 12 59671

(51) Int. Cl.
*F01D 5/08* (2006.01)
*F01D 7/00* (2006.01)
(Continued)

(52) U.S. Cl.
CPC .............. *F01D 5/081* (2013.01); *B64C 11/06* (2013.01); *F01D 5/3007* (2013.01); *F01D 7/00* (2013.01);
(Continued)

(58) Field of Classification Search
CPC . F01D 5/08; F01D 5/081; B64C 11/06; Y02T 50/66; Y02T 50/676
See application file for complete search history.

(56) References Cited

U.S. PATENT DOCUMENTS 3,045,762 A  *  7/1962  Gaubis ................... B64C 11/14
                                                            416/94
4,180,372 A  * 12/1979  Lippert, Jr. ........... F03D 7/0252
                                                            416/132 B
(Continued)

FOREIGN PATENT DOCUMENTS

CN         1200164 A      11/1988
CN         1162345 A      10/1997
(Continued)

OTHER PUBLICATIONS

English translation of Chinese Office Action.*
(Continued)

*Primary Examiner* — Woody Lee, Jr.
*Assistant Examiner* — Topaz L Elliott
(74) *Attorney, Agent, or Firm* — Pearne & Gordon, LLP

(57) ABSTRACT

The main purpose of the invention is a propeller (32) for a turbomachine (1) comprising a plurality of blades (48) and a blade support ring (47) fitted with housings (50) each of which holding a pivot (52) supporting the root (58) of one of said blades (48), characterized in that at least one of the pivots (52) is associated with at least one dynamic scoop (100), capable of moving between distinct positions, an open position in which a cooling airflow (F) can be captured, and a closed position as a function of the orientation of the corresponding blade.

12 Claims, 5 Drawing Sheets

(51) Int. Cl.
*B64C 11/06* (2006.01)
*B64D 27/00* (2006.01)
*F01D 5/30* (2006.01)

(52) U.S. Cl.
CPC .... *B64D 2027/005* (2013.01); *F05D 2220/30* (2013.01); *F05D 2260/20* (2013.01); *Y02T 50/66* (2013.01); *Y02T 50/672* (2013.01); *Y02T 50/673* (2013.01); *Y02T 50/676* (2013.01)

(56) References Cited

U.S. PATENT DOCUMENTS

| | | | |
|---|---|---|---|
| 4,732,538 A | | 3/1988 | Wollenweber |
| 5,039,278 A | * | 8/1991 | Wakeman ............... F01D 7/00 416/239 |
| 5,112,191 A | | 5/1992 | Strock |
| 5,191,915 A | * | 3/1993 | Elmer .................. F16D 35/021 137/625.27 |
| 5,993,149 A | | 11/1999 | Smed |
| 6,120,249 A | * | 9/2000 | Hultgren ............... F01D 5/187 416/193 A |
| 7,581,926 B1 | * | 9/2009 | Dehlsen ............... F03D 7/0236 416/1 |
| 2006/0120855 A1 | | 6/2006 | Djeridane |
| 2011/0110781 A1 | | 5/2011 | Dao |
| 2011/0167835 A1 | | 7/2011 | Beutin |
| 2011/0217172 A1 | | 9/2011 | Fabre |
| 2014/0099205 A1 | | 4/2014 | Tajan |
| 2014/0099206 A1 | | 4/2014 | Tajan |
| 2015/0011354 A1 | | 1/2015 | Fabre |

FOREIGN PATENT DOCUMENTS

| | | | | |
|---|---|---|---|---|
| FR | 2 645 499 A1 | | 10/1990 | |
| FR | 2 941 494 A1 | | 7/2010 | |
| GB | 882807 A | * | 11/1961 | ............ F16D 33/14 |
| GB | 2 226 087 A | | 6/1990 | |

OTHER PUBLICATIONS

International Search Report issued in Application No. PCT/FR2013/052382 dated Dec. 4, 2013.
Written Opinion issued in Application No. PCT/FR2013/052382 dated Dec. 4, 2013.
U.S. Appl. No. 14/583,910, "Turomachine Assembly Comprising Two Bodies and Means for Guiding a Fluid Flowing From One Bady to the Other" filed Dec. 29, 2014.
Office Action issued in corresponding Chinese Patent Application No. 201380051140.5 dated Mar. 2, 2016.

* cited by examiner

PROPELLER COMPRISING A MOVEABLE DYNAMIC SCOOP

TECHNICAL FIELD

This invention relates to the field of turbomachines, and particularly open rotors for turbomachines, and more specifically cooling of elements of the propellers and particularly the root of blades. It thus relates to a propeller for a turbomachine, and also a turbomachine comprising such a propeller.

The invention is applicable to any type of land or aeronautical turbomachines, and particularly aircraft turbomachines such as turbojets and turboprops. More particularly, the invention has a preferred application in the field of turbomachines for aircraft for which the engine casing contains twin counter-rotating open rotor propellers, this type of turbomachines also being called "open rotors", or propfans. Such a turbomachine may for example comprise a fan fixed directly onto the power turbine outside the nacelle, or driven through a geared power turbine. In general, the turbomachine to which the invention is applicable may preferably be a geared type open rotor (with a gear box) or a direct drive type open rotor (with free power turbine) turbomachine.

STATE OF PRIOR ART

FIG. 1 diagrammatically shows a turbomachine 1 with twin counter-rotating open rotors in a classical embodiment according to prior art as disclosed in patent application FR 2 941 494.

In FIG. 1, direction A corresponds to the longitudinal direction or axial direction parallel to the longitudinal axis 2 of the turbomachine 1. Direction B corresponds to the radial direction of the turbomachine 1. Furthermore, the arrow 4 diagrammatically shows the main gas flow direction through the turbomachine 1. The terms "upstream" and "downstream" used in the remainder of the description should be considered relative to this gas flow direction 4.

In the forward direction, the turbomachine 1 has an air inlet 6 that continues in the aft direction through a nacelle 8, which globally comprises an outer skin 10 and an inner skin 12, both centred on the axis 2 and radially offset from each other.

The inner skin 12 forms the external radial casing for a gas generator 14, conventionally comprising (working from the upstream end towards the downstream end), a low pressure compressor 16, a high pressure compressor 18, a combustion chamber 20, a high pressure turbine 22 and an intermediate pressure turbine 24. The compressor 16 and the turbine 24 are mechanically connected through a shaft 26 thus forming a low pressure body, while the compressor 18 and the turbine 22 are mechanically connected by a shaft 28 forming a higher pressure body. Consequently, the gas generator 14 preferably follows a conventional design called twin spool.

On the downstream side of the intermediate pressure turbine 24 there is an engine casing 30 with a twin open rotor with counter-rotating propellers, driven in this example by free power turbines. As a variant, a geared power turbine could be used. More precisely, the 15 engine casing 30 is located downstream from a fixed casing 42, itself arranged along the aft extension of the external radial casing 12 of the gas generator 14. Furthermore, the casings 12 and 42 may be made in a single piece. The fixed casing 42 then extends in the aft direction becoming smaller along the radial direction to form a fixed shaft 57 centred on the axis 2 forming the fixed casing of the engine casing 30.

The engine casing 30 comprises firstly a first rotating assembly 32a fitted with a first propeller 32, a first free power turbine 34 driving this propeller, and a first rotating structural device 33 along the axial extension of the free turbine 34 in the forward direction, being inserted between the first stage of this turbine and the fixed casing 42. The rotating structural device 33 is usually in the form of a plurality of arms at a circumferential spacing from each other and that extend radially. These arms are connected to the first propeller 32 supporting the outer casing of the turbine 49 itself connected to the propeller 32 particularly through an end plate or a plurality of clips 44 so that this propeller 32 can be offset radially outwards. The clips 44 have an internal radial end fixed to the outer casing 49, and an external radial end fixed to a polygonal ring (not shown in FIG. 1) supporting the blades 48. These blades 48 extend radially outwards from an outer propeller casing or cover 46, one of the features of which is that it is aerodynamically continuous with the outer skin 10 of the nacelle in the aft direction.

Similarly, the engine casing 30 comprises a second rotating assembly 36a provided with a second propeller 36, a second free power turbine 38 driving this propeller, and a second rotating structural device 37 located along the axial extension of the free turbine 38 in the aft direction and being located behind the last stage of this turbine 38. The rotating structural device 37 that extends essentially in the radial direction supports the second propeller 36 being connected to it particularly through an end plate or a plurality of clips 51 so that the propeller 36 can be offset radially outwards. Also in this case, the clips 51 have an internal radial end fixed to the rotating structural casing 37, and an external radial end fixed to a polygonal ring (not shown in FIG. 1) to support the blades 55. These blades 55 extend radially outwards from an outer casing or cover 54 that is aerodynamically continuous with the outer cover 46 of the first propeller 32 in the aft direction.

Furthermore, the first and second free turbines 34, 38 are nested inside each other so as to form twin counter-rotating turbines. The stages of the first turbine 34 are thus arranged alternately with the stages of the second turbine 38 along direction A. Therefore these twin rotors can also be treated like a turbine with two counter rotating rotors. For information, the free turbines 34, 38 have no direct mechanical connection with the rotating components of the gas generator 14, namely they do not drive and they are not driven by elements 16, 18, 22, 24. Therefore only gases in the core engine flowpath escaping from the intermediate pressure turbine 24 rotate these free turbines 34, 38 forming the twin counter-rotating turbines.

The design of the first propeller 32 will now be described in more detail with reference more specifically to FIGS. 2 to 4, it being understood that the second propeller 36 has an identical or similar design and therefore will not be described further.

As mentioned above, the propeller 32 comprises a polygonal ring 47 acting as a support for the blades 48, this ring 47 forming a hub of the propeller. It comprises a plurality of housings 50 circumferentially spaced from each other, these housings 50 being called radial housings. Each receives a pivot 52, a bearing 80 being inserted between this pivot 52 and its associated housing 50 forming a reaming, as shown in FIG. 3.

Each pivot 52 has a lower part 52a placed inside its associated housing, this lower part 52a being approximately cylindrical and hollowed out so as to have a generally U-shaped section radially open inwards. Furthermore, the pivot 52a extends radially outwards through an upper part 52b located above the ring 47, this upper part 52b having a groove 56 diagrammatically shown in FIG. 4, the function of which is to retain the root 58 of the associated blade 48. Thus, the pivot 52 supports the blade 48 and its pitch can be adjusted by controlling rotation of this pivot 52 within its housing 50 in the polygonal ring 47.

The propeller 32 also includes the outer cover 46 shown in FIGS. 1 and 3 only. The outer surface of this cover is followed by the external air flow. In this respect, note that each blade 48 has a platform 59 from which its aerodynamic part 60 projects radially outwards. Each platform 59 is circular in shape and is placed within an orifice provided through the cover 46 so as to obtain approximately flush aerodynamic junctions.

As can be seen better in FIG. 3, a blade cavity 64 is associated with the blade 48, the purpose of this cavity being to isolate the root of the blade from the remainder of the turbomachine 1, particularly, the core engine flowpath passing radially inwards. The cavity 64 was diagrammatically identified in FIG. 3 by the dashed line reference 64. It is effectively closed in the radially outwards direction by the platform 59 and the outer cover 46 forming the aerodynamic fairing, but it is also closed in the upstream direction by one or several caches 66, and closed in the downstream direction by one or several caches 68, and closed radially outwards by one or several caches 70, in this case a single cache 70 fixed to the flange or to the above-mentioned clips 44.

Note that a blade root cavity may be provided for each blade as shown diagrammatically in FIG. 5 with an inner cache 70 provided for each blade, which makes the cavities independent of each other. Alternately, all the blades 48 of the propeller 32 may share a single blade root cavity, and in this case the selected single internal cache 70 is designed in the shape of a ring.

Ventilation may be provided for example by supplying external air to each cavity 64 through a scoop 72 or similar device (for example a simple orifice) placed on the outer cover 46. This scoop may in particular be placed on the downstream side, and air passing through the cavity 64 may for example subsequently be extracted through an outlet (not shown) further upstream. As it passes through the cavity 64, the cool external air will follow and cool the elements located in this cavity 64 by ventilation, and particularly the root 58 of the blade as shown diagrammatically by the arrow 53.

In practice, it is difficult to provide ventilation and cooling of the elements of the propeller 32 and particularly the propeller roots 58, particularly due to pressure conditions at low Mach numbers. However, it is particularly important to provide such ventilation and such cooling when the blades 48 are made from composite materials that have lower resistance to high temperatures than metallic materials. In the "pusher" configuration shown in FIG. 1, in which the open rotors are located downstream from the combustion chamber in the aft direction, these propellers are arranged just above the core engine flowpath where the hot gases can reach 500° C. Therefore it is essential to provide special ventilation to prevent overheating of blade roots in these open rotors.

Nevertheless, the disclosed solution described above only uses the pressure difference between the dynamic air intake on the downstream side formed by the scoop 72, and the static air outlet on the upstream side. Therefore it is very dependent on the aircraft speed, which is problematic in some phases such as idling and takeoff during which the airflow along the root of the blade may not be sufficient to provide satisfactory cooling.

Moreover, the constant presence of a dynamic scoop to capture a ventilation air flow usually causes an increase in aerodynamic drag which is not desirable, particularly because it must be possible for the scoop to go beyond the boundary layer. The maximum need for added ventilation air is typically only required during some very specific flight phases, particularly during an idling phase and/or a takeoff phase. Thus, the use of a permanently fixed dynamic scoop can generate high stresses that can be prejudicial to aerodynamics and acoustics during its use outside the operating points for which it is required, particularly at low speed and low power. For example, the aerodynamics of such a scoop designed for a low Mach number will create non-negligible aerodynamic drag at a high Mach number. Similarly for acoustics, once the operating point requiring strong ventilation has been passed, the scoop will "shear" the boundary layer and generate noise. Furthermore, the generated noise will become louder as the upstream velocity increases.

Furthermore, documents GB 2 226 087 A, US 2006/120855 A1 and FR 2 645 499 A1 also illustrate the state of prior art.

PRESENTATION OF THE INVENTION

The purpose of the invention is thus to at least partially satisfy the needs mentioned above and overcome the disadvantages related to embodiments according to prior art.

In particular, the purpose of the invention is to disclose a solution for efficient ventilation and cooling of blade roots, particularly blades made from composite materials. Another purpose of the invention is to disclose a solution that does not generate undesirable effects prejudicial to aerodynamics and/or acoustics.

Thus, according to one of the aspects of the invention, its purpose is a propeller for a turbomachine comprising a plurality of blades and a blade support ring fitted with housings each of which will hold a pivot supporting the root of one of said blades, characterised in that at least one of said pivots is associated with at least one dynamic scoop capable of moving between distinct positions, an open position in which a cooling airflow can be captured, and a closed position as a function of the orientation of the corresponding blade.

"Open position" means a position of the dynamic scoop in which it can capture the external airflow. The dynamic scoop may be more or less open depending on the pitch of the blade. For example, the scoop opening amplitude may be different for a takeoff phase and for an idling phase. More generally, the dynamic scoop is said to be in an "open position" when it captures an airflow, the amplitude of the scoop opening can be variable.

"Closed position" means a position of the dynamic scoop in which it cannot capture an external airflow.

In particular, the propeller may be an open rotor propeller.

In particular, the airflow is an external airflow, particularly a cold external airflow to provide ventilation.

With the invention, it may be possible to ventilate and cool the blade roots by bringing the ventilation airflow directly into contact with the blade roots. Use of the dynamic scoop may depend directly on the orientation of the blade and therefore its pitch. In particular, capture of the airflow by the dynamic scoop may only be possible for some blade orientations, and therefore for example for some flight phases. Thus the invention can be used to add a dynamic scoop that is useful only for some critical operating points and does not generate any prejudice for other operating points, particularly in terms of aerodynamics and/or acoustics.

In this application, the axial direction corresponds to the direction of the X rotation axis of the turbomachine, and a radial direction is a direction perpendicular to the X axis. Furthermore, the terms "internal" and "external" are used with reference to a radial direction such that the internal (i.e. radially internal) part of an element is closer to the X axis and the external (i.e. radially external) part of this element.

The propeller according to the invention may also comprise one or several of the following characteristics taken in isolation or in any technically possible combination.

The open position of the dynamic scoop may correspond to a predetermined orientation of the blade. Advantageously, the open position of the dynamic scoop may be obtained during a flight phase with a low Mach number, for example during an idling phase and/or a takeoff phase. The blade may for example be oriented in the feathered position. The need for a ventilation airflow is higher during these phases at low power and low speed, and thus the dynamic scoop is placed in the open position to be able to capture the external ventilation airflow. The invention can thus avoid the use of a permanent dynamic scoop beyond the boundary layer, which is not necessary during a high Mach number phase, for example at cruising speed, and for example generates high aerodynamic drag.

The dynamic scoop may be moved from the closed position to the open position by a centrifugal effect due to the blade rotation speed when the blade moves into a position at a predetermined orientation, and particularly into the feathered orientation or position. In particular, the open position of the dynamic scoop may be obtained by deployment of the dynamic scoop under the effect of a centrifugal force, through an orifice formed in the outer cover of the propeller as described below.

The pivot may be provided with at least one counterweight system. The movement from the closed position to the open position of the dynamic scoop may be obtained by actuation of the counterweight system on the dynamic scoop. In particular, the counterweight system may control opening and/or closing of the dynamic scoop. The open position of the dynamic scoop may be obtained by deployment of the dynamic scoop under the action of the counterweight system, through an orifice formed in the outer cover of the propeller as described below.

The counterweight system may typically be designed so that the blade can be brought back into a predetermined position, particularly the feathered position.

The counterweight system may comprise a counterweight arm and a counterweight. The pivot may be fitted with two counterweight systems thus comprising two counterweight arms each provided with a counterweight.

At least one counterweight arm and/or at least one counterweight may be capable of bearing on the dynamic scoop, for example on a specific part of the scoop provided for this purpose, to move it from the closed position to the open position.

The dynamic scoop may act as a closed valve, capable of opening by centrifugal effect and/or actuation of a counterweight system, to capture a ventilation airflow and thus particularly for cooling the blade root.

The propeller may comprise an outer propeller cover from which the blades will project outwards. The cover may comprise an orifice through which the dynamic scoop may be moved from the open position to the closed position and vice versa.

In other words, the closed position of the dynamic scoop may be any position in which the dynamic scoop is located radially inwards, under the cover. The open position of the dynamic scoop may be a position in which the dynamic scoop extends through the orifice formed in the cover and emerges radially outwards above the cover.

The dynamic scoop is free to move between the open and closed positions through a pivot connection. The pivot connection enables rotation of the dynamic scoop to move from the closed position to the open position and vice versa. For example, the pivot connection is a hinge connection and/or a sliding connection.

The pivot may be associated with a ring fixed to the cover and supporting the dynamic scoop. The ring may extend around the entire pivot, particularly being located radially under the platform of the pivot. The ring and the dynamic scoop may be located radially inwards under the cover.

The propeller may comprise an elastic return device, and particularly an elastic spring capable of holding the dynamic scoop in the closed position. In particular, the elastic return device can return and/or hold the dynamic scoop in the closed position when the blade leaves a predetermined orientation for which capture of an airflow is desired, and/or is not in this orientation, particularly for the feathered position.

The blades and particularly the blade roots, and/or said at least one counterweight system and/or dynamic scoop may be made from a composite material.

The counterweight arm of the counterweight system may comprise an inner air flowstream channel.

The inner air flowstream channel may cool the blade root supported by the pivot by routing an air flow from the dynamic scoop to the blade root. It can also achieve cooling of any other element requiring special ventilation.

The inner channel may have an internal end that opens up onto the pivot and at least either an air flow inlet end or an air flow outlet end. In particular, the inner channel may comprise an air flow inlet end and an internal end opening up onto the pivot to cool the pivot. As a variant, the inner channel may comprise an internal end opening up onto the pivot, through which hot air enters from the pivot to the inner channel, and an outlet end through which hot air is discharged.

The pivot may comprise at least one inner communicating channel, of which one end opens up at the blade root and the other end opens up at a channel inside the counterweight system.

The propeller may also comprise a flow channel provided between the dynamic scoop and the pivot to route the cooling airflow from the dynamic scoop to the pivot. For example, the pivot may comprise a communicating inner channel, of which one end opens up at the blade root and the other end of which opens up at such a flow channel.

Another purpose of another aspect of the invention is a turbomachine characterised in that it comprises a propeller like that defined above.

For example, the propeller may be located upstream or downstream from a combustion chamber of the turbomachine.

The turbomachine may preferably be of the "open rotor" type. In particular, the turbomachine may comprise twin open rotors, each of the two propellers being a propeller like that described above.

BRIEF DESCRIPTION OF THE DRAWINGS

The invention will be better understood after reading the detailed description given below of non-limitative examples of the invention, and after examining the diagrammatic and partial figures in the appended drawing in which.

Identical references of all these figures may refer to identical or similar elements.

Furthermore, the different parts shown in the figures are not necessarily all shown at the same scale to make the figures more easily readable.

DETAILED PRESENTATION OF PARTICULAR EMBODIMENTS

Two example embodiments of the invention will be described below with reference to FIGS. 6 to 9, related to an aircraft turbomachine with open rotors, however these examples are not limitative.

FIGS. 6 to 9 are diagrammatic and partial, and FIGS. 1 to 5 described above should be referred to for the display of elements not shown in FIGS. 6 to 9.

Figure 1:
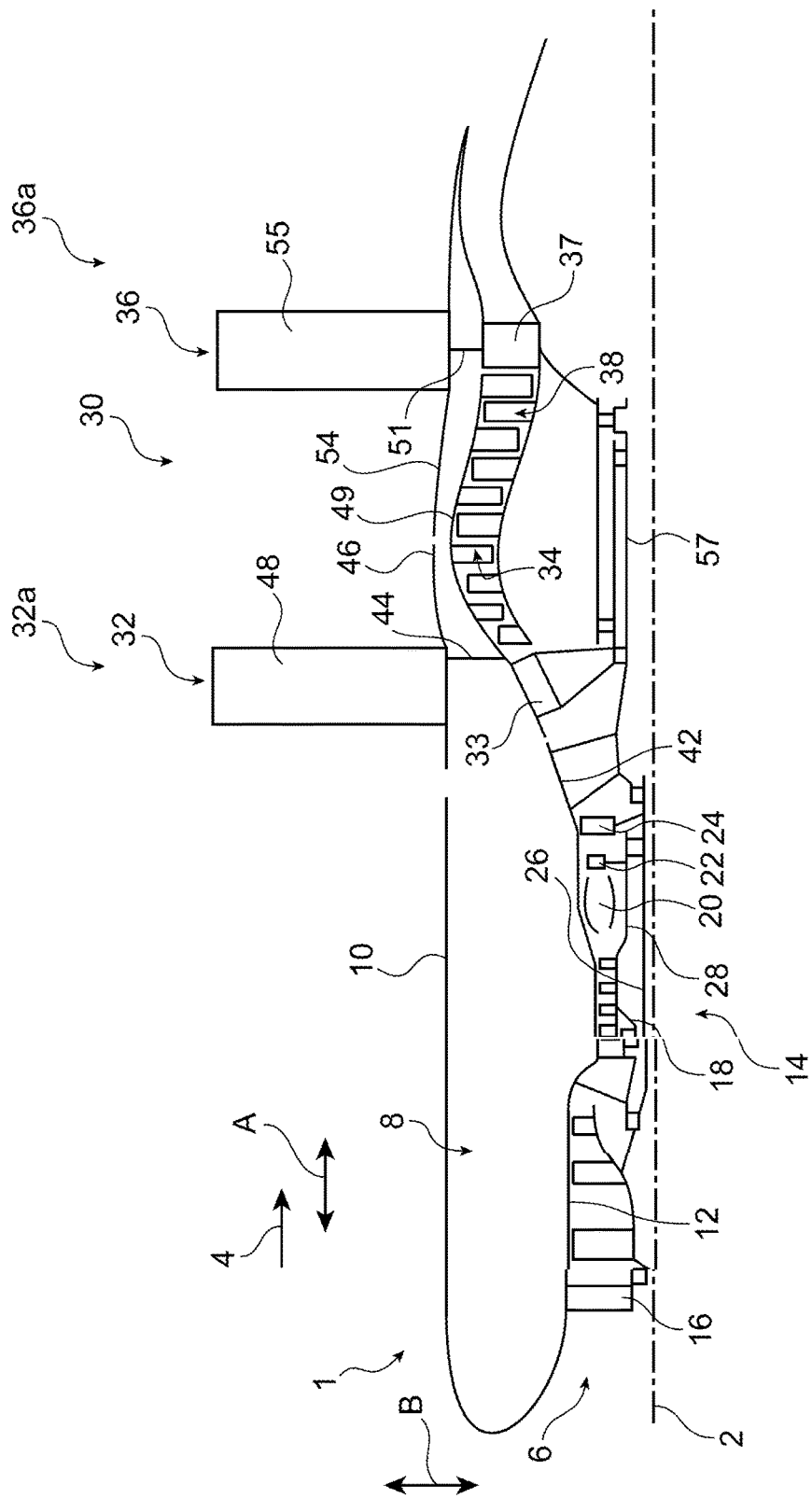
FIG. 1 shows a diagrammatic longitudinal half-sectional view of a turbomachine for an aircraft provided with a conventionally designed engine casing for open rotors according to prior art.
Figure 2:
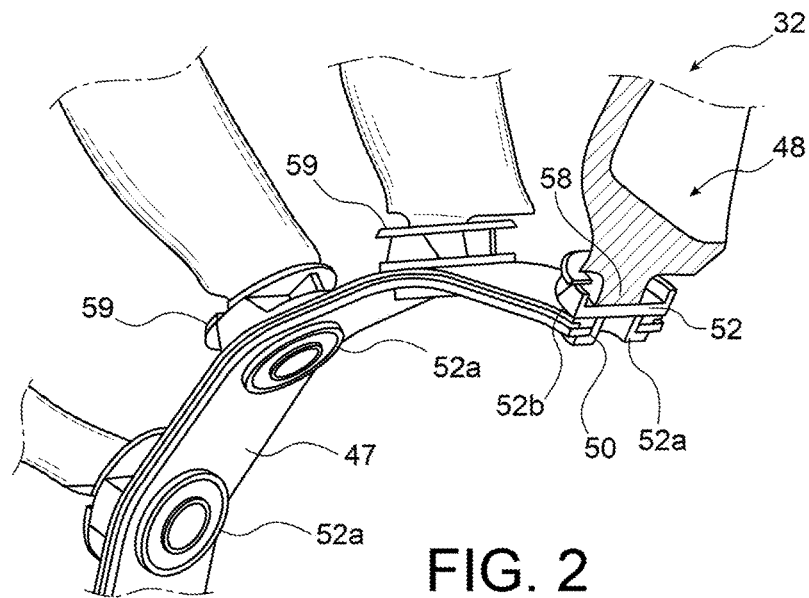
FIG. 2 shows a partial perspective view of one of the open rotors of the turbomachine shown in FIG. 1.
Figure 3:
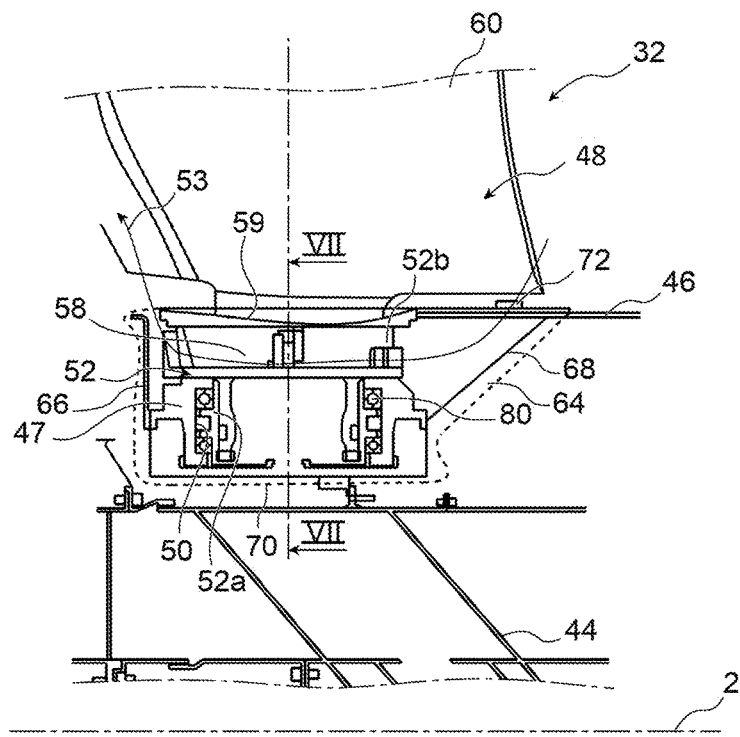
FIG. 3 shows a partial sectional view showing the propeller blade support ring and surrounding elements in more detail.
Figure 4:
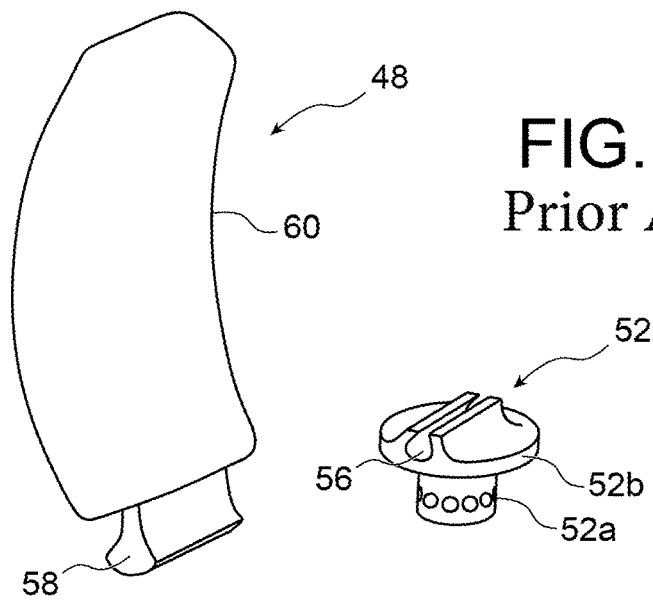
FIG. 4 shows an exploded perspective view of a blade and its associated pivot.
Figure 5:
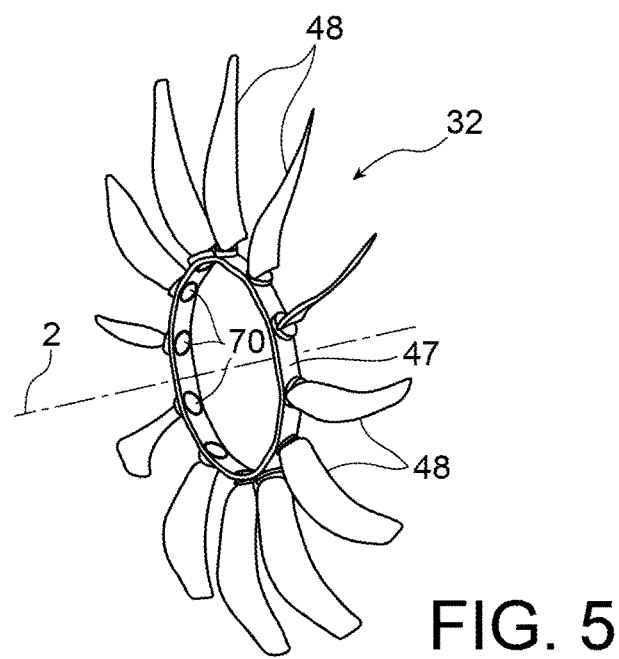
FIG. 5 shows a perspective view of a propeller according to prior art, in which there are several blade root cavities, FIGS. 6, 7A and 7B contain a partial perspective and sectional view of an example embodiment of the invention.
Figure 6:
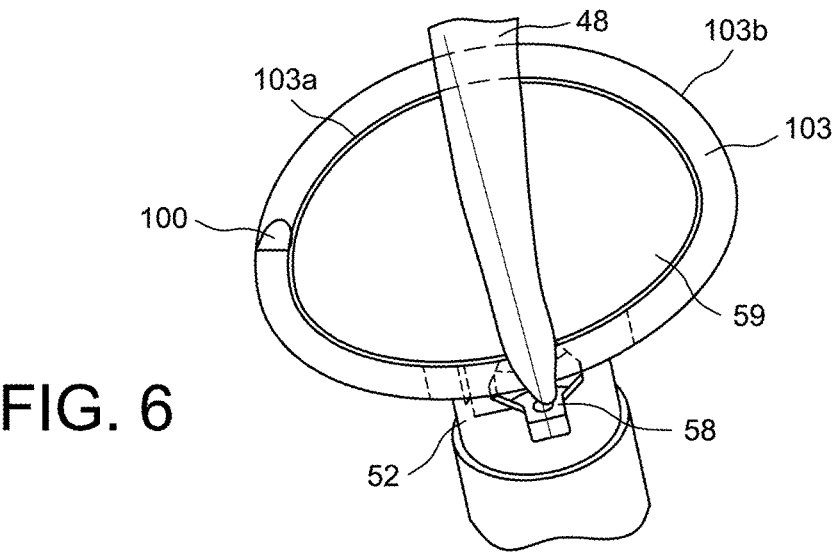
Figure 7A:
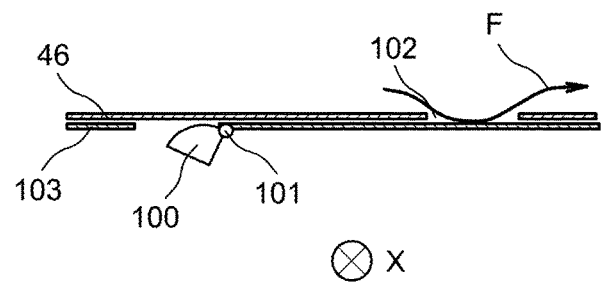
Figure 7B:
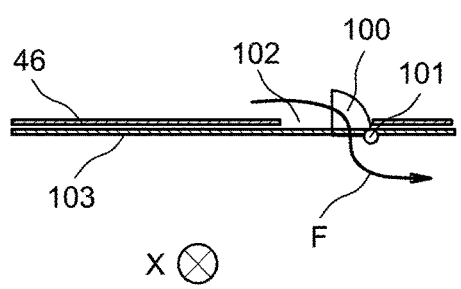

FIGS. 6, 7A and 7B show a first example embodiment of a propeller 32 according to the invention.

FIGS. 7A and 7B show a sectional view of a configuration of the propeller in which the dynamic scoop 100 is in a closed position and a configuration of the propeller in which the dynamic scoop 100 is in the open position, respectively, to capture a cooling airflow F.

FIG. 6 diagrammatically shows a pivot 52 supporting the blade root 58 of a blade 48 of the propeller 32.

The pivot 52 comprises a platform 59 that will be placed inside an orifice provided through the outer cover of the propeller 46 (not shown in FIG. 6) so as to obtain approximately flush aerodynamic junctions.

A ring 103 located radially inwards from the platform 59 is associated with the pivot 52. In particular, the ring 103 is connected to the pivot 52 of the blade root 58 through its two ends, one concentric end 103a and one eccentric end 103b connected to the cover 46, for example through dynamic joints. Thus, the ring 103 is located under the cover 46, radially inwards from the cover 46.

According to the invention, the pivot 52 is associated with a dynamic scoop 100 fixed to the mobile ring 103.

More particularly, the dynamic scoop 100 is connected to the ring 103 through a pivot connection 101 (see FIGS. 7A and 7B), and particularly a hinge connection, that enables displacement of the dynamic scoop 100 between the open position and the closed position. The hinged connection 101 is particularly straight to enable movement of the dynamic scoop 100.

The closed position of the dynamic scoop 100 corresponds to a position in which the dynamic scoop 100 is located under the cover 46 as shown in FIG. 7A. In this position, the air flow F does not come into contact with the blade root 58.

The open position of the dynamic scoop 100 corresponds to a position in which the dynamic scoop 100 is located above the cover 46 to allow capture of the cooling air flow F as shown in FIG. 7B.

In FIGS. 7A and 7B, only the cover 46, the dynamic scoop 100 and the ring 103 are shown to make understanding easier. The rotation axis X of the turbomachine 1 is perpendicular to the plane of FIGS. 7A and 7B.

The cover 46 comprises an orifice 102 through which the dynamic scoop 100 may be moved from the open position to the closed position and vice versa.

In the configuration in FIG. 7A, the dynamic scoop 100 is in the closed position and is located under the cover 46. When the blade 48 is fixed in a predetermined position, for example the feathered position that may be a position corresponding to an idling phase and/or takeoff phase, the dynamic scoop 100 is in line with the orifice 102 just below the orifice 102 and opens to move to the open position due to the centrifugal effect (configuration in FIG. 7B). Opening of the dynamic scoop 100 by the centrifugal effect then allows the cooling air flow to enter so that the blade root 58 can be cooled.

More specifically, the cooling air flow F may be routed in a blade cavity 64 associated with the blade 48 as described above, or it may be routed directly under the blade root 58, particularly through a flow channel provided between the dynamic scoop 100 and the pivot 52 to allow the cooling airflow F to pass from the dynamic scoop 100 to the pivot 52.

In this case, the pivot 52 may comprise a communicating inner channel, one end of which opens up at the blade root 52 and the other end opens up at such a flow channel.

Furthermore, for the case in which the pivot 52 is fitted with a counterweight system 90 as described with reference to FIG. 9, an inner flow channel for the cooling air flow F may be provided in the counterweight arm 90a of the counter weight system 90 so that the airflow F can pass from the dynamic scoop 100 to the blade root 58.

Figure 8:
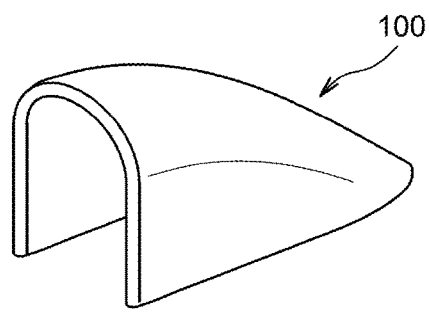
FIG. 8 shows a perspective view of an example of a dynamic scoop for a propeller according to the invention.

FIG. 8 shows a perspective view of an example of a dynamic scoop 100 that can be used in a propeller 32 according to the invention.

Figure 9:
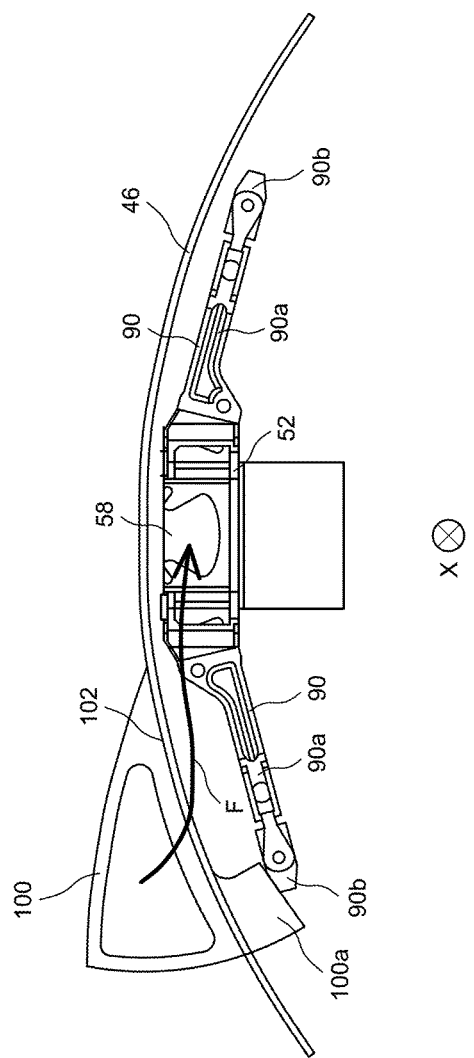
FIG. 9 shows a sectional partial view of another example embodiment according to the invention.

FIG. 9 shows a sectional view of a second example embodiment according to the invention.

In this example, the pivot 52 is provided with two counterweight systems 90 each having a counterweight arm 90a and a counterweight 90b. The counterweight 90b may for example be made from tungsten.

The movement of the dynamic scoop 100 from the closed position to the open position may be controlled by actuation of the counterweight system 90, for example by means of the counterweight 90b on the dynamic scoop 100. More precisely, the counterweight system 90 can bear on a specific part 100a of the dynamic scoop 100 to bring the dynamic scoop 100 into the open position when the blade 48 is brought into a predefined orientation, particularly through one or more counterweight systems 90, in other words when the dynamic scoop 100 reaches the orifice 102 formed in the cover 46.

When the dynamic scoop 100 is in the closed position or when it moves away from the open position to reach the closed position, an elastic return spring (not shown) fixed to the dynamic scoop 100 may be used to bring the dynamic scoop 100 into the closed position and hold it there.

Once the air flow F has ventilated the blade root 58 to cool it, it can be discharged.

Airflow discharge means may also be provided particularly taking account of the position of the pitch of the blade 48 and the need for maximum ventilation to avoid making cooling less efficient due to the ingress of air discharged into a dynamic ventilation air flow inlet scoop.

In all previously described examples, the blades 48 and particularly the blade roots 58 and/or the counterweight systems 90 and/or the dynamic scoop 100 may be made from composite materials.

Obviously, the invention is not limited to the example embodiments that have just been disclosed. Those skilled in the art can make various modifications to it.

In particular, the open and closed positions of the dynamic scoop 100 may be controlled other than through a pivot connection, and particularly the hinge connection. Different ways may be envisaged for routing the airflow F from the dynamic scoop 100 to the blade root 58.

The expression "comprising a" must be understood as being synonymous with "comprising at least one", unless specified otherwise.

What is claimed is:

1. Propeller for a turbomachine comprising:
    a plurality of blades; and
    a blade support ring fitted with housings each of which holds a pivot supporting the root of one of said blades, wherein at least one of the pivots is connected to a ring that supports at least one dynamic scoop, the scoop being capable of moving between distinct positions, an open position in which a cooling airflow can be captured, and a closed position as a function of the orientation of the corresponding blade, and wherein the at least one dynamic scoop is movable relative to the root supported by at least one of the pivots.

2. Propeller according to claim 1, wherein said at least one dynamic scoop is moved from the closed position to the open position by a centrifugal effect due to the rotation speed of the blade, when the blade moves into a position at a predetermined orientation.

3. Propeller according to claim 1, wherein the pivot is provided with at least one counterweight system, the movement from the closed position to the open position of said at least one dynamic scoop being obtained by actuation of said at least one counterweight system on said at least one dynamic scoop.

4. Propeller according to claim 3, wherein the counterweight system comprises a counterweight arm and a counterweight, the counterweight arm and/or the counterweight being capable of bearing on said at least one dynamic scoop to move it from the closed position to the open position.

5. The propeller of claim 1, further comprising an outer propeller cover from which the blades will project outwards, the cover comprising an orifice through which said at least one dynamic scoop is moved from the open position to the closed position and vice versa.

6. Propeller according to claim 1, wherein said at least one dynamic scoop is free to move between the open and closed positions through a pivot connection.

7. The propeller of claim 1, further comprising an outer propeller cover from which the blades will project outwards, and wherein the ring and said at least one dynamic scoop are located radially inwards under the cover.

8. Turbomachine comprising a propeller according to claim 1.

9. Turbomachine according to claim 8, wherein said propeller is located downstream from a combustion chamber of said turbomachine.

10. The propeller of claim 5, wherein said at least one dynamic scoop is configured to capture the cooling airflow disposed adjacent the cover.

11. Propeller according to claim 6, wherein said pivot connection is a hinge connection.

12. Propeller according to claim 6, wherein said pivot connection is a sliding connection.

* * * * *